United States Patent
Mori et al.

[11] Patent Number: 5,502,584
[45] Date of Patent: Mar. 26, 1996

[54] PROCESS FOR PRODUCING FERROELECTRIC LIQUID CRYSTAL DEVICE

[75] Inventors: Sunao Mori, Atsugi; Tadashi Mihara, Isehara; Yasuto Kodera, Fujisawa, all of Japan

[73] Assignee: Canon Kabushiki Kaisha, Tokyo, Japan

[21] Appl. No.: 213,527

[22] Filed: Mar. 16, 1994

[30] Foreign Application Priority Data

Mar. 16, 1993 [JP] Japan ................................. 5-082717
May 28, 1993 [JP] Japan ................................. 5-151251

[51] Int. Cl.⁶ .......................... G02F 1/1341; G02F 1/141
[52] U.S. Cl. ........................... 359/90; 359/100; 359/78
[58] Field of Search .......................... 359/90, 62, 80, 359/100, 75, 78; 430/20

[56] References Cited

U.S. PATENT DOCUMENTS

| | | |
|---|---|---|
| 4,367,924 | 1/1983 | Clark et al. .......................... 350/334 |
| 5,035,491 | 7/1991 | Kawagishi et al. ................. 350/350 S |
| 5,103,331 | 4/1992 | Taniguchi et al. .................... 359/81 |
| 5,182,662 | 1/1993 | Mihara ................................... 359/63 |
| 5,204,766 | 4/1993 | Taniguchi et al. .................... 359/81 |
| 5,250,330 | 10/1993 | Asaoka et al. ........................ 428/1 |
| 5,276,542 | 1/1994 | Iwayama et al. .................... 359/86 |
| 5,293,534 | 3/1994 | Mihara ................................... 359/84 |
| 5,305,131 | 4/1994 | Terada et al. ........................ 359/104 |
| 5,355,236 | 10/1994 | Mitsui .................................... 359/62 |

Primary Examiner—William L. Sikes
Assistant Examiner—Tai V. Duong
Attorney, Agent, or Firm—Fitzpatrick, Cella, Harper & Scinto

[57] ABSTRACT

A liquid crystal device suitable as a display device is produced through a process wherein a chiral smectic liquid crystal is injected into a blank cell in a temperature where two higher temperature phases, such as isotropic phase and cholesteric phase or cholesteric phase and smectic A phase, of the liquid crystal are co-present. As a result, the liquid crystal injection is completed in a relatively short period to provide the liquid crystal device with a uniform alignment characteristic of the liquid crystal.

6 Claims, 2 Drawing Sheets

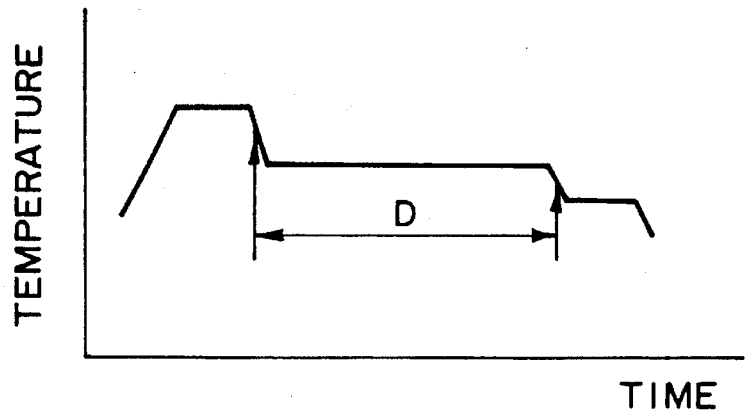
F I G. 3
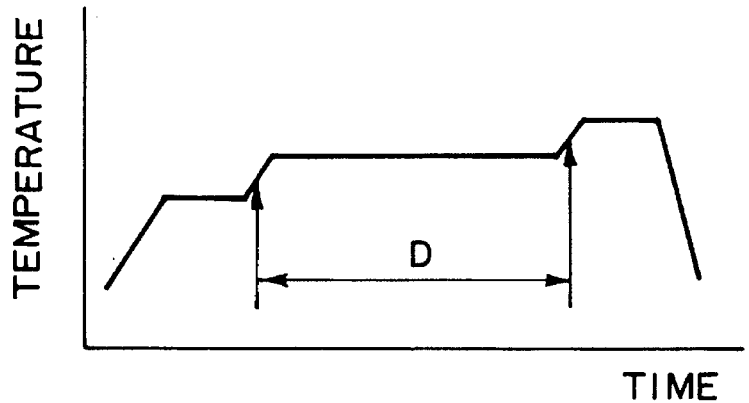
F I G. 4
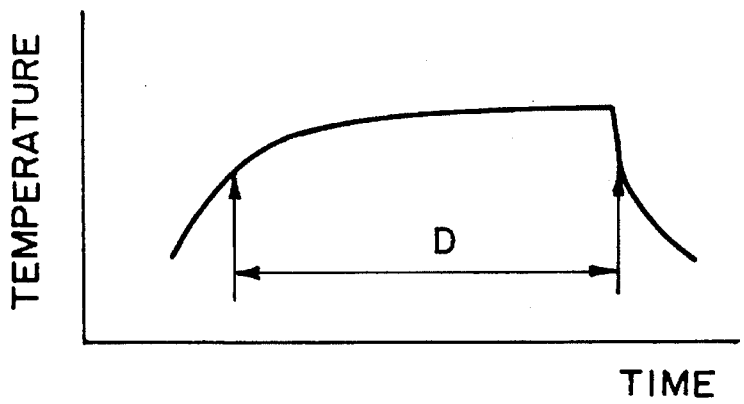
F I G. 5

PROCESS FOR PRODUCING FERROELECTRIC LIQUID CRYSTAL DEVICE

FIELD OF THE INVENTION AND RELATED ART

The present invention relates to a process for producing a liquid crystal device usable as a display device included in television receivers, view finders for video cameras, terminal monitors for computers, etc.

A display device of the type which controls transmission of light in combination with a polarizing device by utilizing the refractive index anisotropy of ferroelectric liquid crystal molecules has been proposed by Clark and Lagerwall (Japanese Laid-Open Patent Application No. 107216/1981, U.S. Pat. No. 4,367,924). The ferroelectric liquid crystal has generally chiral smectic C phase (SmC*) or H phase (SmH*) of a non-helical structure and, under this state, shows a property of taking either one of a first optically stable state and a second optically stable state responding to an electrical field applied and maintaining such state in the absence of an electrical field, namely bistability, and also has a rapid response to the change in electrical field. Thus, it is expected to be utilized in a high speed and memory type display device and particularly to provide a large-area, high-resolution display.

In order to cause the ferroelectric liquid crystal to exhibit such high-speed responsiveness and memory characteristic, it is necessary to set the spacing between transparent electrodes sandwiching the liquid crystal in the liquid crystal device to a value which is at most the helical pitch of the ferroelectric liquid crystal developed in its cholesteric (Ch) phase. As a result, the following difficulties are encountered in the production process.

A ferroelectric liquid crystal generally used in its chiral smectic (Sm*C) phase causes a phase transition to higher temperature phases inclusive of smectic A (SmA) phase, Ch phase and isotropic (Iso) phase depending on the temperature and is generally injected into a liquid crystal cell (device) while the liquid crystal is one of the higher temperature phases. For example, if the injection is performed in isotropic phase, the ferroelectric liquid crystal in isotropic phase has a low viscosity and is injected into the cell while the molecules thereof spread in random directions. As a result, the injection cannot be performed smoothly and the liquid crystal can be injected to an inner part in advance while leaving some nearer pixel parts unfilled in addition to gradually filling the cell from the injection port in some cases. Such initially unfilled or incompletely filled parts are liable to cause alignment failure leading to a locally ununiform alignment state of the ferroelectric liquid crystal, thus resulting in a lower display quality of the liquid crystal display device.

On the other hand, in the case where the liquid crystal is injected in the Ch phase, the above difficulty is obviated but an alignment irregularity presumably attributable to a helical structure inherent to Ch phase is caused. This is presumably because the helical pitch inherent to Ch phase is temperature-dependent and accordingly the alignment regulating force from the upper and lower alignment films can fluctuate due to a temperature irregularity or a thickness irregularity present in the direction of extension of the liquid crystal cell. The alignment irregularity naturally results in a lower display quality as a whole.

On the other hand, the injection of a ferroelectric liquid crystal in its SmA phase has been confirmed to be impractical because the liquid crystal has too high a viscosity and requires a vast time until the completion of the injection.

SUMMARY OF THE INVENTION

In view of the above-mentioned problems of the prior art, an object of the present invention is to provide a process for producing a liquid crystal device wherein a chiral smectic liquid crystal is injected uniformly without causing an alignment irregularity in the direction of extension of the device, thereby providing an improved display quality, a shortened time for the injection and an improved productivity.

According to the present invention, there is provided a process for producing a liquid crystal device including a chiral smectic liquid crystal disposed between a pair of opposite substrates, comprising injecting the chiral smectic liquid crystal in a temperature range where two higher temperature phases of the liquid crystal are co-present.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 3–5 are respectively a graph showing a temperature profile changing with time used in the liquid crystal injection step in the process of the present invention.

DETAILED DESCRIPTION OF THE INVENTION

The two higher temperature phases copresent in the temperature range for the injection may be Iso phase and Ch phase, or Ch phase and SmA phase in case where the chiral smectic liquid crystal causes a successive phase transition of SmA phase, Ch phase and Iso phase on temperature increase. Alternatively, in case where the chiral smectic causes a successive phase transition of Iso phase, SmA phase and chiral smectic (Sm*) phase, particularly chiral smectic C (Sm*C) phase, the two higher temperature phases copresent in the temperature range for the injection may be Iso phase and SmA phase.

It is preferred that the chiral smectic liquid crystal to be injected is held in the temperature range where the two higher temperature phases are co-present in a period t satisfying the following relationship with respect to a total period D required for injecting the liquid crystal into the entire space between the opposing substrates of the cell:

$t \geq 0.5 \times D.$

The substrates may preferably be provided with an alignment control film subjected to a uniaxial aligning treatment so that the liquid crystal is disposed in its chiral smectic phase to provide a pretilt angle with respect to the alignment control film of at least 5 degrees.

Hereinbelow, the present invention will be described with reference to drawings.

Figure 1:
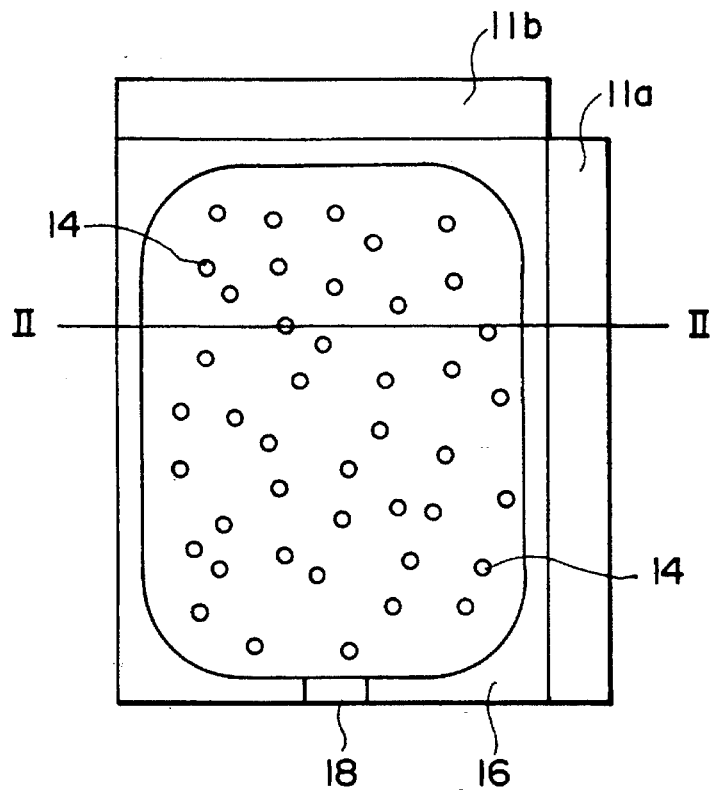
FIG. 1 is a plan view showing a general structure of a liquid crystal display device according to the present invention.
Figure 2:
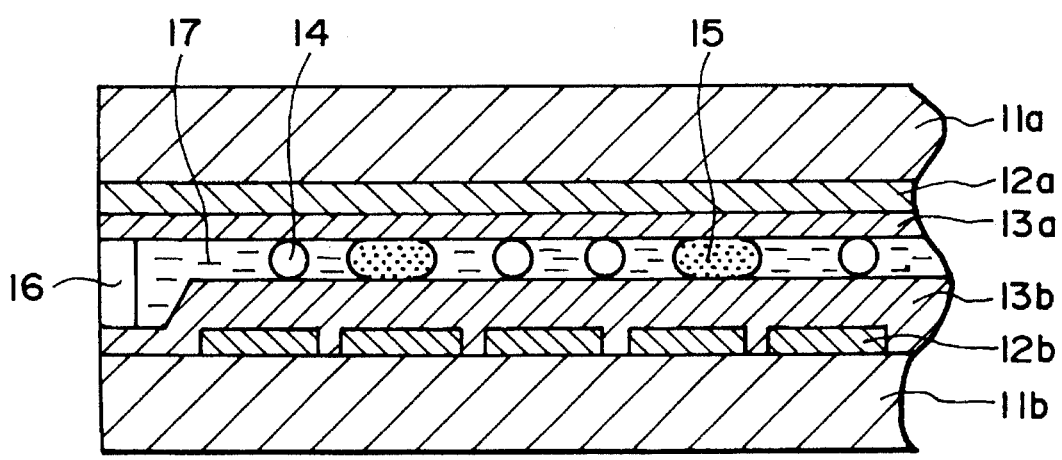
FIG. 2 is a sectional view of the liquid crystal device taken along a line II—II in FIG. 1.

FIG. 1 is a plan view and FIG. 2 is a corresponding sectional view in a thickness direction taken along a II—II line in FIG. 1, respectively, of a liquid crystal display device for the illustration of a general structure of such a device.

More specifically, the liquid crystal device includes a pair of glass plates 11a and 11b disposed oppositely with a prescribed gap therebetween. The glass plates 11a and 11b are provided with about 400– 2000 Å-thick transparent electrodes 12a and 12b, respectively, and further coated with alignment control films 13a and 13b, respectively. In this embodiment, the alignment control films 13a and 13b comprise an organic polymer, such as polyimide, and formed in a thickness on the order of 10–1000 Å. While not included in this embodiment, it is also possible to insert an insulating film of, e.g., $SiO_2$, in a thickness of 100–2000 Å between the transparent electrodes 12a, 12b and the alignment control films 13a, 13b.

Between the alignment control films 13a and 13b, spacer beads 14 of, e.g., silica or alumina, having an average diameter of about 1.5 μm (generally 0.1–3.5 μm) so as to retain the spacing between the alignment control films 13a and 13b at a prescribed value, and epoxy-based adhesive particles 15 (e.g., "Toraypearl" available from Toray K.K.) are disposed to secure the glass substrates 11a and 11b to each other by bonding. The adhesive particles 15 originally have an average diameter on the order of 5 μm but are flattened into disks because the gap between the glass plates 11a and 11b are held by a smaller size of the spacer beads 14 (FIG. 2).

Further, the glass plates 11a and 11b are bonded to each other at their outer periphery with, e.g., an epoxy-based sealing adhesive 16 to define a closed space (blank cell) therebetween while leaving an liquid crystal injection port 18, which is further to be sealed with, e.g., an epoxy-based adhesive after injection of a liquid crystal 17 into the cell.

EXAMPLE 1

In a specific example, a liquid crystal cell as shown in FIGS. 1 and 2 having an effective display area of 280 mm×230 mm was formed by injecting a pyrimidine-based mixture liquid crystal as the ferroelectric liquid crystal 17.

The alignment control films 13a and 13b were formed by applying a 1% solution of a polyimide precursor ("LQ1802" available from Hitachi Kasei K.K.) in N-methylpyrrolidone onto glass substrates 11a and 11b by means of a spinner coater, followed by baking at 270° C. for 60 min. The alignment films were then respectively rubbed in one direction with a nylon fiber-planted cloth wound about a 150 mm dia.-roller rotating at 1000 rpm.

The pyrimidine-based mixture liquid crystal showed the following phase transition series as a result of observation through an optical microscope while subjecting the liquid crystal 17 to a temperature change. For example, within a temperature range of 85±1° C., the liquid crystal showed ISO phase and Ch phase in mixture:

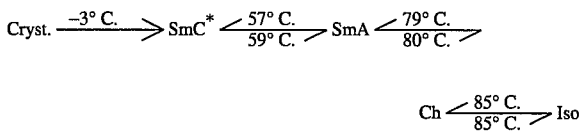

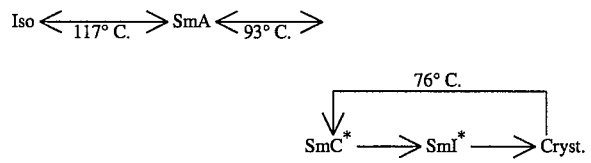

The ferroelectric liquid crystal 17 was injected through the injection port 18 where the sealing adhesive 16 was not applied and, after the injection, the injection port 19 was sealed with an additional sealing adhesive 16. In this example, the liquid crystal was injected at a temperature of 85° C. where Iso phase and Ch phase were co-present in mixture.

As a result, the ferroelectric liquid crystal 17 thus injected was confirmed to provide a more uniform alignment free from alignment disorder compared with the case where the same liquid crystal was injected at 100° C. at which the liquid crystal completely assumed isotropic phase. The improved result is believed to be attributable to a fact that the liquid crystal showed a lower viscosity at the injection temperature because of the co-presence of the Ch phase than the Iso phase alone and therefore was injected gradually through the injection port 18. Further, compared with the case wherein the liquid crystal was injected, e.g., at 82° C. showing Ch phase alone, to result in an alignment defect, the liquid crystal device of this example was free from such an alignment defect, thereby showed a high display quality free from alignment defect.

EXAMPLE 2

In this example, the ferroelectric liquid crystal 17 was injected at 80° C. where Ch phase and SmA were co-present. As a result, the liquid crystal in the resultant device was free from an alignment defect which might be attributable to a helical structure inherent to Ch phase caused in the case where the liquid crystal was injected at 82° C. providing Ch phase alone, and the injection was completed in a remarkably shorter time than in the case where the liquid crystal was injected at a temperature providing SmA phase alone.

As is understood from the above examples, according to the present invention, it is possible to provide a liquid crystal display device showing a high display quality and free from alignment irregularity in a relatively short injection time, thus at an improved productivity.

In the above examples, a specific pyrimidine-based mixture liquid crystal was used but it is of course possible to use another chiral smectic liquid crystal. In such a case, however, it is necessary to again determine the phase transition temperatures for the chiral smectic liquid crystal by observation through a polarizing microscope and determine a temperature region where two higher temperature phases are co-present.

EXAMPLE 3

A liquid crystal device similar in structure to the one prepared in Example 1 was prepared by using a mixture crystal comprising principally DOBAMBC and showing the following phase transition temperatures.

Iso $\xleftrightarrow[117° C.]{}$ SmA $\xleftrightarrow[93° C.]{}$ $$SmC^* \xrightarrow{} SmI^* \xrightarrow{} Cryst.$$
(76° C.)

The temperature $T_0$ (=117° C.) for transition from Sm A phase to isotropic phase was confirmed by observation through a polarizing microscope, and the liquid crystal was injected in a temperature range (e.g., 115°–119° C.) for T satisfying the following relationship:

$$T_0-2.5° C. \leq T \leq T_0+2.5° C.,$$

wherein Iso phase and SmA phase of the liquid crystal were co-present. The liquid crystal injection was performed in a thermostatic vessel large enough to enclose the liquid crystal device according to a temperature profile shown in FIGS. 3–5 wherein D denotes a total injection period from the commencement of the liquid crystal injection through the injection port to a time when the liquid crystal reached the entirety of the farthest side within the cell. In any profile, a period t of the specific temperature range ($T_0-2.5°$ C.$\leq T \leq T_0=2.5°$ C.) was controlled to satisfy: $t \geq 0.5 \times D$.

As a result of the liquid crystal injection in the above-described manner wherein the period t was set to 15 hours, all the pixels were filled with the liquid crystal and the alignment irregularity was not observed. As a result, it was possible to attain an improved contrast, a wider drive voltage margin and an improved display quality compared with the case wherein the liquid crystal was injected at a temperature giving Iso phase alone. Further, compared with the case wherein the liquid crystal was injected at a temperature giving SmA phase alone, the injection time could be shortened, thus providing an improved productivity of the liquid crystal display device.

More specifically, in the case where the liquid crystal was injected in the temperature range of 120°–125° C. giving Iso phase alone, the complete filling with the liquid crystal was not accomplished to leave insufficiently filled pixels where the drive characteristic was different from the surrounding pixels. As a result, the drive voltage margin of the liquid crystal device was narrowed and the uniformity of alignment state in the pixels was impaired to result in a lowered contrast. On the other hand, in the case where it was tried to inject the liquid crystal in a temperature range of 108°–113° C. giving SmA phase alone, the liquid crystal was hardly injected because of a high liquid crystal viscosity.

EXAMPLE 4

A liquid crystal device was prepared in a similar manner as in Example 3 by using a chiral smectic liquid crystal ("TFK-8616" available from Teikoku Kagaku Sangyo K.K.) showing the following phase transition temperatures:

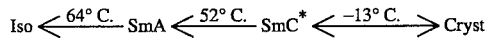

$$\text{Iso} \xleftarrow{64° C.} \text{SmA} \xleftarrow{52° C.} \text{SmC}^* \xleftarrow{-13° C.} \text{Cryst}$$

It was confirmed that Iso phase and SmA phase of the liquid crystal were co-present in a temperature range of 61°–67° C., and the liquid crystal was injected in the temperature range while effecting the temperature control in a similar manner as in Example 3.

As a result of the liquid crystal injection in the above-described manner, all the pixels were filled with the liquid crystal and the alignment irregularity was reduced to provide a liquid crystal display device with a uniform alignment over the planar extension of the device.

For comparison, in the case where the liquid crystal was injected in the temperature range of 70°– 75° C. giving Iso phase alone, the complete filling with the liquid crystal was not accomplished to leave insufficiently filled pixels where the drive characteristic was different from the surrounding pixels. As a result, the drive voltage margin of the liquid crystal device was narrowed and the uniformity of alignment state in the pixels was impaired to result in a lowered contrast. On the other hand, in the case where it was tried to inject the liquid crystal in a temperature range of 55°–60° C. giving SmA phase alone, the liquid crystal was hardly injected because of a high liquid crystal viscosity.

As the same effect was confirmed by using a chiral smectic liquid crystal having different phase transition temperatures, it was confirmed that the effect was attained not due to a particular phase transition temperature but owing to the injection in a temperature region where Iso phase and SmA phase was co-present.

What is claimed is:

1. A process for producing a liquid crystal device including a chiral smectic liquid crystal disposed between a pair of opposite substrates, comprising:

selecting a chiral smectic liquid crystal which successively assumes isotropic phase, smectic A phase and chiral smectic phase upon temperature decrease; and injecting the chiral smectic liquid crystal in a temperature range where two higher temperature phases of the liquid crystal are co-present, wherein the two higher temperature phases are the isotropic phase and the smectic A phase.

2. A process according to claim 1, wherein said chiral smectic liquid crystal is injected at a temperature T (°C.) which satisfies the following relationship with respect to a transition temperature $T_0$ (°C.) from the SmA phase to the isotropic phase:

$$T_0-2.5° \text{ C.} \leq T \leq T_0+2.5° \text{ C.}$$

3. A process according to claims 1 or 2, wherein the chiral smectic liquid crystal is in said temperature range for a period which is at least a half of a total period required for injecting the chiral smectic liquid crystal into an entire space between the substrates.

4. A process according to claims 1 or 2, wherein the substrates are provided with a uniaxial alignment film, and the chiral smectic liquid crystal after the injection is aligned to provide a pretilt angle of at least 5 degrees.

5. A process according to claim 3, wherein the temperature of said chiral smectic liquid crystal is lowered during at least a portion of said total period for injecting the chiral smectic liquid crystal.

6. A process according to claim 3, wherein the temperature of said chiral smectic liquid crystal is raised during at least a portion of said total period for injecting the chiral smectic liquid crystal.

* * * * *

UNITED STATES PATENT AND TRADEMARK OFFICE
CERTIFICATE OF CORRECTION

PATENT NO. : 5,502,584

DATED : March 26, 1996

INVENTOR(S) : SUNAO MORI ET AL.

It is certified that error appears in the above-identified patent and that said Letters Patent is hereby corrected as shown below:

COLUMN 1

Line 24, "high speed" should read --high-speed--.

COLUMN 3

Line 8, "400- 2000 Å-thick" should read --400-2000 Å-thick--.
Line 33, "an" should read --a--.

COLUMN 5

Line 9, "C.$\leq T \leq T_0=2.5°$ C.)" should read --C.$\leq T \leq T_0+2.5°$C.)--.

Line 42, "$\xleftarrow{-13°C}$Cryst" should read --$\xleftarrow{-13°C}$Cryst.--.

Signed and Sealed this

Sixth Day of August, 1996

Attest:

BRUCE LEHMAN

Attesting Officer      Commissioner of Patents and Trademarks